United States Patent [19]

Dreyer et al.

[11] 4,284,687

[45] Aug. 18, 1981

[54] COMPOUND BODY

[75] Inventors: Klaus Dreyer, Essen; Hans Grewe, Grefrath-Vinkrath; Johannes Kolaska, Bottrop; Norbert Reiter, Mettmann, all of Fed. Rep. of Germany

[73] Assignee: Fried Krupp Gesellschaft mit beschränkter Haftung, Essen, Fed. Rep. of Germany

[21] Appl. No.: 95,099

[22] Filed: Nov. 16, 1979

[30] Foreign Application Priority Data

Nov. 29, 1978 [DE] Fed. Rep. of Germany ....... 2851584

[51] Int. Cl.³ .................. B32B 9/00; B32B 15/04
[52] U.S. Cl. .................. 428/336; 427/248.1; 427/249; 427/419.1; 427/419.2; 427/419.7; 428/469; 428/472; 428/627; 428/632
[58] Field of Search .............. 427/249, 248.1, 255, 427/255.1, 255.2, 255.3, 255.4, 255.7, 419.2, 419.1, 419.7, 34; 428/539, 336, 450, 538, 469, 472, 627, 632, 633; 148/6.3, 6.35, , 31.5; 30/346.54, 346.53

[56] References Cited

U.S. PATENT DOCUMENTS

| | | | |
|---|---|---|---|
| 3,406,043 | 10/1968 | Balde | 428/472 |
| 3,784,402 | 1/1974 | Reedy | 427/249 |
| 3,807,008 | 4/1974 | Reedy | 427/249 |
| 3,833,430 | 9/1974 | Hill et al. | 148/31.5 |
| 3,837,896 | 9/1974 | Lindstrom et al. | 428/336 |
| 3,874,900 | 4/1975 | Post et al. | 148/31.5 |
| 3,955,038 | 5/1976 | Lindstrom et al. | 427/249 |
| 3,964,937 | 6/1976 | Post et al. | 427/249 |
| 4,035,541 | 7/1977 | Smith et al. | 427/249 |
| 4,098,956 | 7/1978 | Blickensderfer et al. | 428/469 |
| 4,162,338 | 7/1979 | Schintlemeister | 427/249 |

FOREIGN PATENT DOCUMENTS 2528255  2/1976  Fed. Rep. of Germany ........ 427/255.7

*Primary Examiner*—Michael R. Lusignan
*Assistant Examiner*—S. L. Childs
*Attorney, Agent, or Firm*—Spencer & Kaye

[57] ABSTRACT

A compound body comprising a metallic basic body, an inner layer or layers of carbides and/or nitrides of Ti, Zr, Hf, V, Nb, Ta, Cr, Mo, W, Si, or B, and an outer layer or layers of a mixture of oxides and nitrides and/or oxynitrides of Cr, Al, Ca, Mg, Th, Sc, Y, La, Ti, Hf, V, Nb, or Ta. The compound body can be used as a part subject to wear, and for machining metallic materials.

7 Claims, No Drawings

COMPOUND BODY

BACKGROUND OF THE INVENTION

The present invention relates to a compound body composed of a metallic basic body and at least two superposed hard substance layers which contain no binder metals. Such a compound body is used as a part that is subject to wear and for machining metallic materials.

U.S. Pat. No. 3,837,896 discloses a compound body with an outer layer consisting of one or a plurality of extremely wear resistant deposits of $Al_2O_3$ and/or $ZrO_2$, and an inner layer consisting of one or a plurality of carbides and/or nitrides of the elements Ti, Zr, Hf, V, Nb, Ta, Cr, Mo, W, Si, or B. In this compound body the inner layer has a thickness of 1 to $10\mu$ while the outer layer has a thickness of 0.2 to $20\mu$. It has been found to be a drawback that pure oxide layers are very much subject to cracking and easily chip off.

German Offenlegungsschrift No. 2,233,699 discloses a method for increasing wear resistance of hard metal parts in which at least part of the surface of the hard metal part is provided with a coating up to a thickness of $50\mu$ of at least one oxide, nitride or boride. This publication also proposes the application of a coating of a mixture or a combination of the above-mentioned compounds on the hard metal parts.

SUMMARY OF THE INVENTION

It is an object of the present invention to provide a compound body which comprises a metallic basic body and at least two superposed hard substance layers which are free of binder metals.

It is a further object of the present invention to provide a compound body which has improved wear characteristics compared to bodies coated according to prior art methods.

To achieve these objects, and in accordance with its purpose, the present invention provides a compound body comprising a metallic basic body and at least two superposed hard substance layers free from binder metals, the two superposed layers comprising at least one inner layer disposed on the metallic basic body and at least one outer layer disposed on the inner layer, wherein the at least one inner layer disposed on the basic body comprises at least one compound selected from the group consisting of carbides and nitrides of the elements Ti, Zr, Hf, V, Nb, Ta, Cr, Mo, W, Si, and B, and the at least one outer layer disposed on the inner layer comprises at least one oxide and at least one nitride and/or at least one oxynitride of the elements Cr, Al, Ca, Mg, Th, Sc, Y, La, Ti, Zr, Hf, V, Nb, and Ta, the nitrogen content of the outer layer being about 0.1 to about 30 atom percent for each outer layer that is present.

It is to be understood that both the foregoing general description and the following detailed description are exemplary, but are not restrictive of the invention.

DETAILED DESCRIPTION OF THE INVENTION

The metallic basic body of the present invention can be made from a wide variety of materials, among them, high-speed tool steels, Stellites ® (cobalt - chromium -tungsten alloys) and highly heat resistant materials. It has been found particularly advantageous for the basic body to be made of a hard metal. Hard metals contain at least one metallic hard substance, preferably carbides and/or nitrides of the elements of Groups IVb to VIb of the Periodic Table of Elements as set forth in the *McGraw-Hill Encyclopedia of Science and Technology*, Vol. 10, 1971 edition, along with a binder metal, preferably, Fe, Co, Ni, or mixtures of these.

This metallic basic body is provided with at least two coating layers, each free of binder metal, comprising at least one inner layer disposed on the metallic basic body, and at least one outer layer disposed on the inner layer. The inner layer of layers each comprise at least one compound selected from the group consisting of carbides and nitrides of the elements Ti, Zr, Hf, V, Nb, Ta, Cr, Mo, W, Si, and B. Disposed upon this inner layer or layers, is an outer layer or layers, each comprising at least one nitride and at least one oxide and/or at least one oxynitride of the elements Cr, Al, Ca, Mg, Th, Sc, Y, La, Ti, Zr, Hf, V, Nb, and Ta. The nitrogen content of the outer layer or layers is about 0.1 to about 30 atom percent, preferably about 0.2 to about 15 atom percent, in each outer layer that is present.

According to these nitrogen-contents the possible parts of the several oxide-, nitride- and/or oxinitride-phases are given. The compound of two inner layers and one outer layer is preferred.

In a further embodiment of the invention, it is provided that the inner layer or layers of carbides and/or nitrides each have a thickness of 1 to $10\mu$, and the outer layer or layers of at least one nitride and at least one oxide and/or at least one oxynitride each have a thickness of 0.2 to $10\mu$, preferably 0.5 to $5\mu$. By adapting the layer thicknesses as provided herein, the resulting adhesion of the individual layers will be optimized.

In many cases, a compound body whose outer layer consists of at least one oxynitride of the elements Al, Ti, or Zr, has been found to be particularly advantageous.

The compound body according to the invention can be produced by depositing all layers in succession from the gaseous phase at temperatures of 800° to 1100° C. and under pressures of 20 to 800 mbar in a single coating apparatus, thus producing uniformly thick, fine grained coatings which exhibit good adhesion. The deposition of hard substance coatings from the gaseous phase is well known to those skilled in the art.

It has been found that the compound body of the present invention exhibits greatly improved wear characteristics, a result that was not predictable. The unexpectedly good tool-life-behaviour of this compound body is the result of the properties of the refractory hard substance and the functional interaction of the sealing properties of the inner layer or layers and the favorable wear characteristics and high thermodynamic stability of the compounds contained in the outer layer or layers. In particular, it could not be expected that the inclusion of even small quantities of nitrogen in an oxide layer would contribute to a substantial ductilization of the oxidic hard substance layer without a reduction in the length of time the cutting power of the oxidic hard substance layer is maintained. Compared to the prior art compound bodies which have an outer hard substance layer of oxides, the compound bodies according to the present invention have a very broad spectrum of applicability in the machining art.

The present invention will now be explained in detail with the aid of the following example.

EXAMPLE

A basic body which has the shape of a reversible cutting plate and is made of hard metal is provided, in a furnace at a temperature of 1000° C. and under pressure of 40 mbar, with an initial TiC coating of 4μ thickness, over a period of 250 minutes during which the TiC is formed in a gaseous phase reaction from $TiCl_4$ and $CH_4$. Then, at a temperature of 1000° C. and a pressure of 70 mbar, a further layer of 2 to 3μ thickness of a material of the formula $Al_2O_{2.8}N_{0.2}$ is deposited in the same furnace over a period of 120 minutes. This aluminum oxynitride layer is produced by a gaseous phase reaction wherein the gas has the following composition, in volume percent:

50%, $H_2$
46.6%, $N_2$
0.4%, $NH_3$
2%, $CO_2$
1%, $AlCl_3$

The following comparative cutting test was carried out using a tool tip as prepared above.

Material being processed: C 60 steel
Shape of the throwaway insert according to ISO Standard 1832: SNUN 12 04 08
Cutting rate: v=240 m/min
Cutting depth x advance: a×s=1.5×0.28 $mm^2$ per revolution
Cutting time: T=10 minutes.

| Cutting Tool | Crater Depth (μ) | Width of flank Wear (mm) |
| --- | --- | --- |
| Throwaway insert of hard metal with a coating of TiC of 7μ thickness | 74 | 0.36 |
| Throwaway insert of hard metal with an inner coating of TiC of 6μ thickness and an outer coating of $Al_2O_3$ of 1μ thickness | 19 | 0.33 |
| Throwaway insert according to the present invention of hard metal with an inner coating of TiC of 4μ thickness and an outer coating of $Al_2O_{2.8}N_{0.2}$ of 2 to 3μ thickness | 10 | 0.12 |

The results of this test show that the throwaway insert prepared in accordance with the present invention has particularly good cratering and flank wear behavior. The target-hard metal in the above test was the same in each tool-tip. The composition of the hard metal grade is, as follows:

82 wt.% WC,
11 wt.% TiC+TaC, balance cobalt.

It will be understood that the above description of the present invention is susceptible to various modifications, changes and adaptations, and the same are intended to be comprehended within the meaning and range of equivalents of the appended claims.

What is claimed is:

1. A compound body used as a part subject to wear and for machining metallic materials, comprising a metallic basic body and at least two superposed hard substance layers each free from binder metals, the two superposed hard substance layers comprising at least one inner layer disposed on the metallic basic body and at least one outer layer disposed on the inner layer, wherein the at least one inner layer disposed on said basic body comprises at least one compound selected from the group consisting of carbides and nitrides of the elements Ti, Zr, Hf, V, Nb, Ta, Cr, Mo, W, Si, and B, and wherein the at least one outer layer disposed on said inner layer comprises at least one oxide and at least one nitride and/or at least one oxynitride of the elements Cr, Al, Ca, Mg, Th, Sc, Y, La, Ti, Zr, Hf, V, Nb, and Ta, the nitrogen content of said outer layer being about 0.1 to about 30 atom percent for each outer layer that is present.

2. A compound body as defined in claim 1 wherein the nitrogen content of each outer layer that is present is about 0.2 to about 15 atom percent.

3. A compound body as defined in claim 1 wherein the basic body comprises a hard metal.

4. A compound body as defined in claim 1, 2 or 3, wherein each inner layer that is present has a thickness of 1 to 10μ, and each outer layer that is present has a thickness of 0.2 to 10μ.

5. A compound body as defined in claim 4 wherein each outer layer that is present has a thickness of 0.5 to 5μ.

6. A compound body as defined in claims 1, 2 or 3, wherein said outer layers comprise at least one oxynitride of the elements Al, Ti or Zr.

7. A compound body as defined in claim 1, wherein two inner layers are disposed on said basic body and one outer layer is disposed on said inner layers.

* * * * *